United States Patent

[11] 3,611,431

[72] Inventor Carl W. Rosmanith
Des Plaines, Ill.
[21] Appl. No. 814,606
[22] Filed Apr. 9, 1969
[45] Patented Oct. 5, 1971
[73] Assignee Beckman Instruments, Inc.

[54] EASY-LOADING CHART TRANSPORT ARRANGEMENT
12 Claims, 4 Drawing Figs.

[52] U.S. Cl. .................................................. 346/145, 346/136
[51] Int. Cl. .................................................. G01d 11/24, G01d 15/28
[50] Field of Search .................................. 346/136, 145, 68; 226/90, 91, 195

[56] References Cited
UNITED STATES PATENTS

| | | | |
|---|---|---|---|
| 2,412,639 | 12/1946 | Traugott ....................... | 346/145 X |
| 2,590,554 | 3/1952 | Lukacs ......................... | 346/136 X |
| 2,777,747 | 1/1957 | Gilson et al. .................. | 346/136 |
| 3,082,970 | 3/1963 | Rasmussen .................... | 346/136 X |
| 3,119,300 | 1/1964 | Barocela ....................... | 226/90 X |
| 3,154,368 | 10/1964 | Daigler et al. ................ | 346/136 X |
| 3,389,402 | 6/1968 | Rosmanith .................... | 346/145 X |

Primary Examiner—Joseph W. Hartary
Attorneys—Richard M. Jennings and Robert J. Steinmeyer ABSTRACT: The horizontal writing table, back tension roller and initial guide bar of the chart transport mechanism of a direct-writing oscillograph recorder are connected to a common actuating member which may be moved to a loading position and results in the writing table being tilted downwardly and away from the recording pens of the recorder and the back tension roller and initial guide bar being moved away from their normal positions to provide a central opening in the chart transport mechanism through which the end of a recording chart may be easily fed without damage to the recording pens. Upon movement of the actuating member back to its normal recording position the writing table, back tension roller and initial guide bar are all automatically brought back into the correct registration with the other elements of the transport.

INVENTOR:
CARL W. ROSMANITH

INVENTOR:
CARL W. ROSMANITH
By Mason, Kolehmainen, Rathburn & Wyss
Attorneys

EASY-LOADING CHART TRANSPORT ARRANGEMENT

The present invention relates to direct-writing oscillograph recorders, and more particularly, to the chart transport arrangement employed in such recorders to move a chart past the recording pens of the recorder.

Various arrangements have been heretofore proposed for initially threading of the chart in the horizontal chart transport of a direct-writing oscillograph recorder. However, these arrangements have, in the main, involved a difficult and awkward threading of the end of the chart through the various drive rollers, guide bars and over the horizontal writing table of the recorder when a new chart pack is placed in the recorder. Thus, in the majority of recorder chart transports which are designed to drive Z-fold or fanfold charts, the chart must be loaded and threaded from the side of the instrument. The chart pack is usually placed on a shelf of some kind which is below the mechanical structure of the chart transport itself, and the chart must be partially unfolded and extended laterally towards the operator who must then slide the unfolded chart section back into the drive section while carefully threading it around the various guides, under the recorder pen tips and over the writing table, or platen, to the driving rollers. This procedure is difficult and awkward to accomplish and often results in damage to the recording pens. While certain recorders have provided an arrangement for removal of the writing table during threading of the chart, these arrangements have the additional difficulty that the chart must be held in place while replacing the writing table with one hand.

It is, therefore, an object of the present invention to provide a new and improved chart transport arrangement for a direct-writing oscillograph recorder in which the chart pack may be initially loaded and threaded in a simple manner and without damaging the recorder pens.

It is a further object of the present invention to provide a new and improved chart transport mechanism for a recorder in which the horizontal writing table of the recorder may be tilted downwardly to a loading position which provides easy access to the lead end of the chart from the top of the recorder.

It is another object of the present invention to provide a new and improved chart transport mechanism for a recorder wherein both the writing table and the back tension roller of the recorder are moved to positions which provide easy access to the chart pack from the top of the recorder to facilitate initial loading of the chart in the recorder.

It is still another object of the present invention to provide a new and improved chart transport mechanism in which the horizontal writing table of the recorder is locked in horizontal position by means of an overcenter toggle mechanism which may be released to permit the writing table to tilt downwardly to provide access to the chart pack for initial loading.

It is a further object of the present invention to provide a new and improved chart transport for a recorder in which the back tension roller is normally locked in position by means of an overcenter toggle mechanism which may be released to permit the back tension roller to be moved to a loading position which provides easy access to the chart pack from the top of the recorder.

Briefly, in accordance with the present invention, the horizontal writing table of the direct-writing oscillograph recorder is pivotally mounted and is held in its normal horizontal position by means of an overcenter toggle mechanism. The back tension roller and initial guide bar of the recorder are also locked in position by means of an overcenter toggle mechanism. Both of these toggle mechanisms may be released by means of a common actuating member so that the writing table is pivoted downwardly and the back tension roller and guide bar are moved to access positions in which a wide opening is provided through the recorder from the top thereof to the chart pack so as to facilitate initial threading of the chart into the recorder. Once the chart lead has been initially threaded, the writing table and back tension roller may be moved back to their normal positions by means of the common actuating member so that the chart is automatically moved into engagement with the recorder pens and is engaged by the back tension roller and initial guide bar in the correct relationship to ready the chart transport mechanism for a subsequent recording operation.

The invention, both as to its organization and method of operation, together with further objects and advantages thereof, will best be understood by reference to the following specification taken in connection with the accompanying drawings in which.

Figure 1:
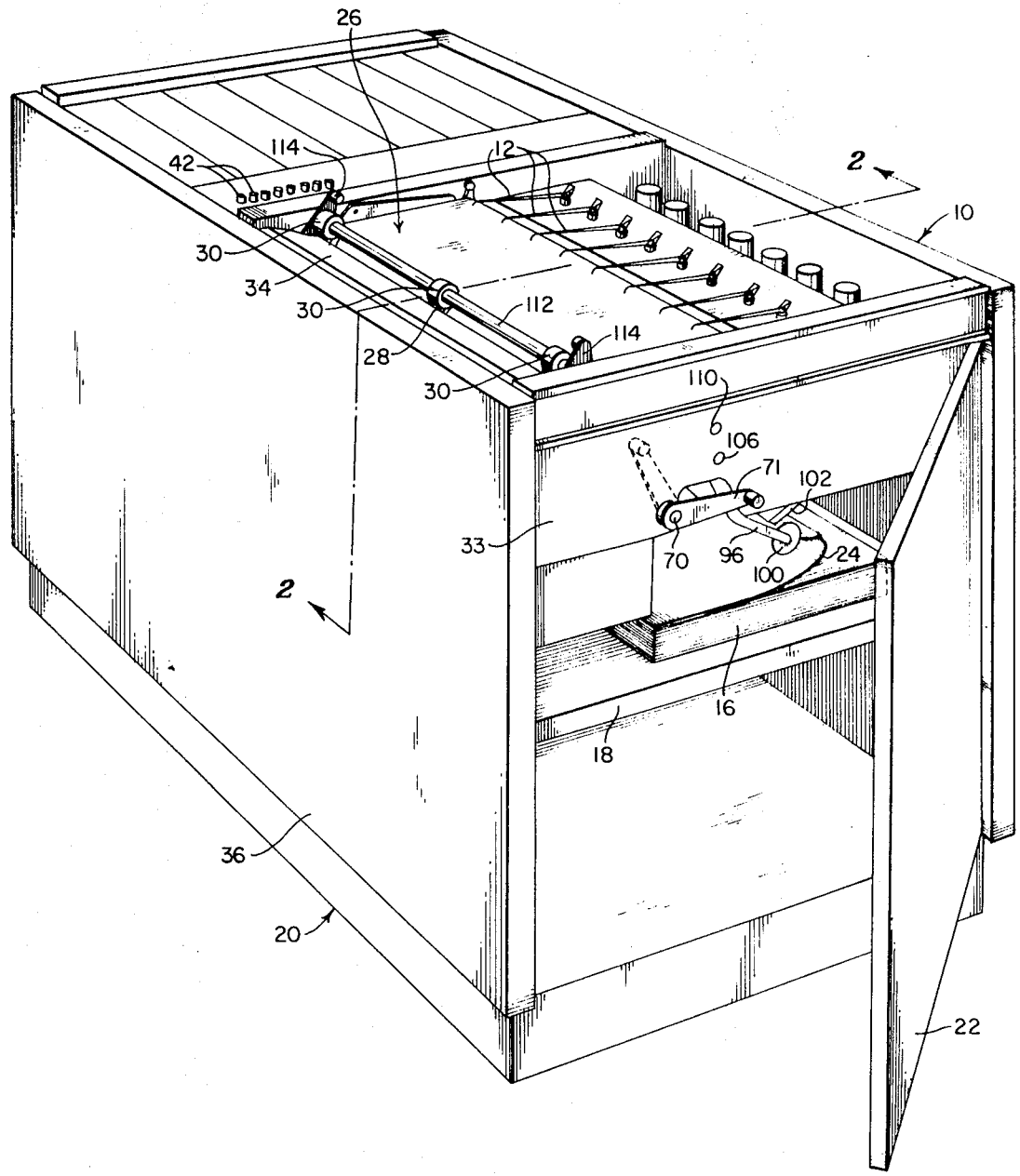
FIG. 1 is a perspective view of a direct-writing oscillograph recorder embodying the features of the present invention.

Referring now to the drawings, the horizontal table chart drive mechanism of the present invention is shown installed within a floor-type console enclosure, indicated generally at 10, and cooperates with a plurality of recorder pens 12 which are driven by means of individual pen motors 14 in response to electrical input signals which are to be recorded on the common chart 16 of the recorder. In the illustrated embodiment, the chart 16 comprises a pack of Z-fold or fanfold chart paper, which rests on a shelf 18 within the console cabinet 20 of the recorder and is accessible through a door 22 provided in the end of the cabinet 20. The active chart web 24, of the chart pack 16 extends upwardly through the various rollers and guide bars of the chart drive mechanism to be described in more detail hereinafter, and over a horizontal writing table indicated generally at 26, to a chart drive mechanism comprising a series of spaced drive rollers 28 and mating pressure rollers 30.

The drive rollers 28 are arranged to be driven from an electric motor 32 so that the Z-fold chart is pulled over the writing table 26 against the force of a back tensioning member, to be described in more detail hereinafter, at a selected speed so the recording pens 12 may trace out appropriate lines on the chart 16 corresponding to the applied input signals, the free end of the chart moving over an exit ramp 34, and then over the front wall 36 of the cabinet 20. More particularly, the motor 32 is mounted on one of the side support members 31 of the chart transport and is connected through a multijaw coupling 38 to an eight-speed gearbox 40 which is electrically controlled by means of a series of pushbuttons 42 mounted in the top wall of the console 10. The output shaft 44 of the gearbox 40 is connected by means of the intermediate gearing, indicated generally at 46 and mounted on the other side support member 33 of the chart transport, to the drive roller shaft 48 on which the drive rollers 28 are mounted. The side support members 31 and 33 are connected together through a number of side bars 35 to form the main support structure of the chart transport mechanism.

Referring now more particularly to the arrangement provided for ease in loading and threading the chart pack into the recorder, under normal recording conditions the writing table 26 is held in a horizontal position by means of an overcenter toggle mechanism comprising a table coupler link 50 and a drive link 52. More particularly, the writing table 26 comprises a writing plate or platen 54 and a pair of side members 56 which are pivotally mounted to the side support members 31, 33, of the chart transport mechanism by means of the pins 58. A crossbar 60 is provided to give rigidity to plate 54 and forming bar 62 is provided at the leading edge of the table 26 over which the chart web extends. The upper end of the table coupler link 50 is pivotally mounted on an adjustable eccentric cam 65 carried on a pin 63 which is supported between the arms 64 of a U-shaped bracket 67 secured to the under side of the writing plate 54 by means of the screws 66. The drive link 52 comprises a pair of side members 68 which are connected to a drive link shaft 70 which is rotatably mounted in the side support members 31 and 33 of the chart transport mechanism and has an actuating crank 71 (FIG. 1) connected to the end thereof exteriorly of the side support 33. A pin 72 connects the upper ends of the side members 68 together and the bottom end of the table coupler link 50 is pivotally mounted on a pin 74 which extends between the side members 68 and is held in place by means of a cotter pin 76.

Figure 2:
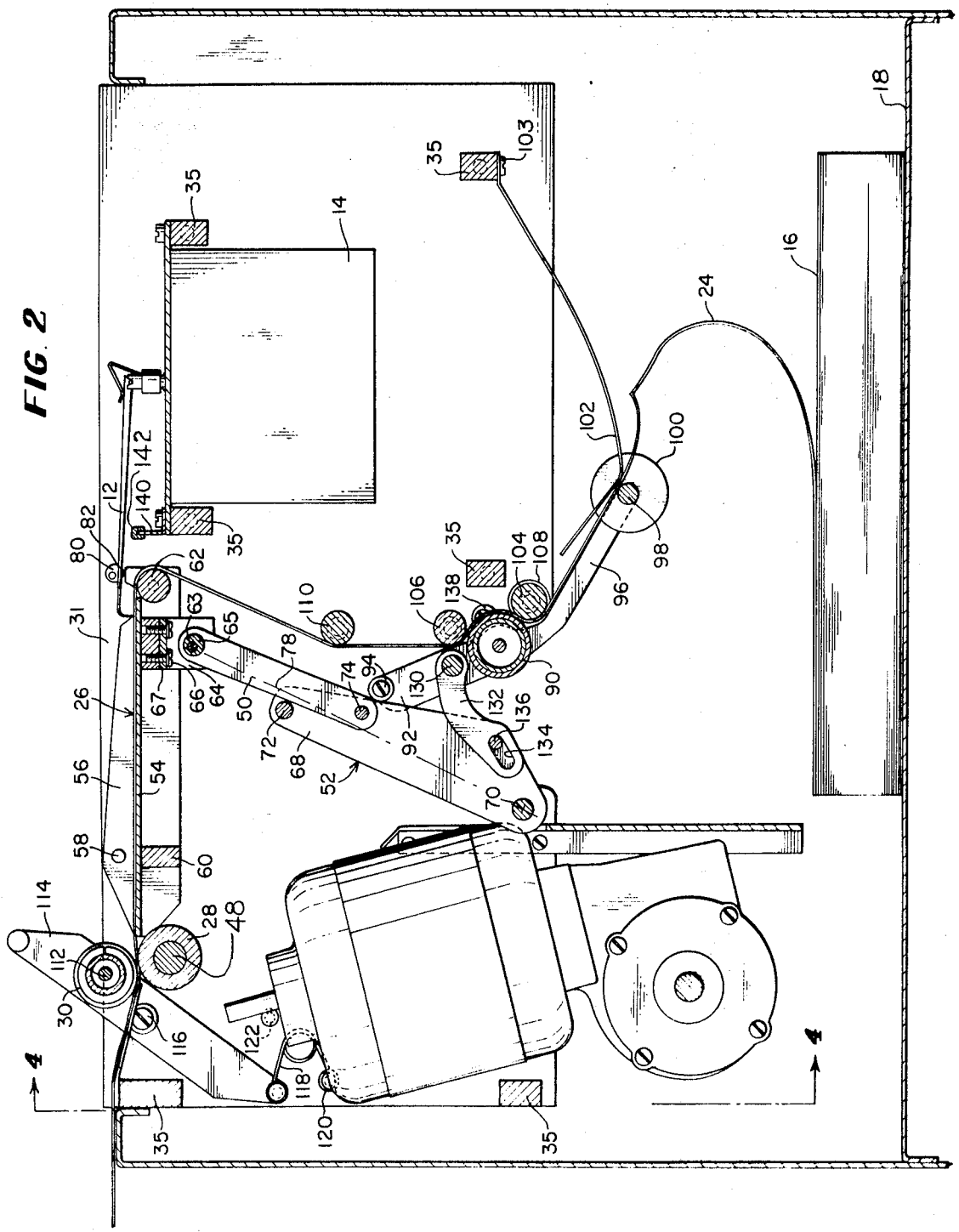
FIG. 2 is a sectional view taken along the lines 2—2 of FIG. 1 and showing the chart drive mechanism in recording position with a pack of Z-fold chart paper inserted and threaded through its path to the drive rollers of the recorder.

It will be noted that when the pin 72 engages the edge of the table coupler link 50, as shown in FIG. 2, the pivot pin 74 at the bottom end of the link 50 is positioned beyond the centerline 78 connecting the centers of the drive link shaft 70 and the eccentric cam 65 so that an over-center toggle action is provided whereby the writing table 26 is locked in a horizontal position. The spring compliance necessary to achieve this over-center toggle action is provided by flexure of the drive link shaft 70 due to the fact that the toggle mechanism 50, 52 is mounted approximately midway of the shaft 70, and this shaft may have a length of approximately 16 inches in the case of a recorder using 16-inch chart paper. The amount of flexure of the shaft 70 and hence the force with which the toggle mechanism 50, 52 is held in locked position, may be adjusted by adjustment of the eccentric cam 65. Also, the final position of the writing table 26 and its parallelism to the other guide elements of the system is established by means of a pair of eccentric cams 80 which are mounted on the side support members 31, 33 of the chart transport and engage flat shoulder portions 82 on the side members 56 of the writing table 26.

In order to provide a back tensioning mechanism against which the chart web may be pulled by the drive rollers 28 so that the chart may be pulled smoothly over the writing table 26 during the recording operation, a back tensioning roller 90 is provided which is rotatably mounted on a pair of roller support links 92 the upper ends of which are pivotally mounted on the side support members 31, 33 by means of the bearing studs 94. The roller support links 92 are provided with offset end portions 96 which carry at the free end thereof a guide bar 98 provided with a pair of web-centering guide flanges 100 at either end thereof. The chart web 24 extends over the guide bar 98 between the flanges 100 and is held against the bar by means of a series of spring fingers 102 which are secured to one of the crossbars 35 by means of the screws 103. The first guide bar 98 thus establishes a reference point for the start of the chart web 24 through the chart transport mechanism.

The back tension roller 90 is provided with an outer surface having a very high coefficient of friction and this roller is constructed so that an adjustable amount of torque is required to rotate the roller, as will be readily understood by those skilled in the art. The chart is held against the outer surface of the roller 90 by means of a second guide roll 104 which is mounted between the side support members 31, 33 of the chart transport, and a freely rotating guide roller 106 which is also rotatably mounted in the side support members 31, 33. The guide roll 104 is positioned so as to control the entrance angle of the chart web 24 to the outer surface of the back tension roller 90 and the guide roller 106 is located so as to hold the chart web 24 against the surface of the roller 90 and to control the point at which the chart leaves this surface. The guide roll 104 is provided with a flange 108 which acts to maintain the chart web 24 in alignment as it moves past the back tension roller 90. After the chart web 24 leaves the roller 106, it moves over a guide bar 110, which is supported on the side supports 31 and 33, over the forming bar 62 of the writing table 26 under the recording pens 12 and over the writing plate 54 between the side members 56.

The pressure rollers 30 are rotatably mounted on a shaft 112 which is carried by a pair of support arms 114 which are pivotally mounted on the side support members 31, 33 by means of the studs 116. The pressure rollers 30 are normally urged against the drive rollers 28 by means of a pair of coil springs 118 one end of each of the springs 118 being connected to the bottom end of the support members 114 and the other end thereof being connected to the side support members 31, 33 as indicated at 120. The pressure rollers 30 may be moved away from the drive rollers 28 by moving the support members 114 to the loading position shown in FIG. 3 in which position these members engage the stops 122 on the side supports 31, 33. The chart lead may then be inserted between the rollers 28 and the rollers 30, and the rollers 30 moved into engagement with the upper surface of the chart web so that the drive rollers 28 can pull the chart web through the chart transport against the drag of the back tension roller 90.

Considering now the manner in which the back tension roller 90 is positioned in correct relation with respect to the rollers 104 and 106 so as to provide the above-described back tension drag on the chart web, a separator bar 130 is connected to and extends between the roller support links 92 and a roller coupler link 132 is employed in conjunction with the drive link 52 to provide a second over-center toggle mechanism which functions to lock the back tension roller 90 and the guide bar 98 in their respective positions during the recording operation. More particularly, the roller coupler link 132 is rotatably mounted on the separator bar 130 at the middle thereof and the other end of the link 132 is provided with a slot 134 within which is positioned a pin 136 which is secured to the side members 68 of the drive link 52, and is held in place by means of a cotter pin 138.

When the drive link 52 is positioned in the locking position for the writing table 26, the pin 136 is positioned beyond the centerline connecting the centers of the shaft 70 and the separator bar 130 so that an over-center toggle mechanism is provided which accurately holds the back tension roller 90 at the desired position with respect to the rollers 104 and 106. The spring compliance necessary to achieve this over-center toggle action is provided by the flexure of the separator bar 130, and to some extent the flexure of the drive link shaft 70. The correct position of the back tension roller 90 may be adjusted by means of a pair of eccentric cams 138 which are mounted on the side support members 31, 33 and engage the edges of the roller support links 92.

Figure 3:
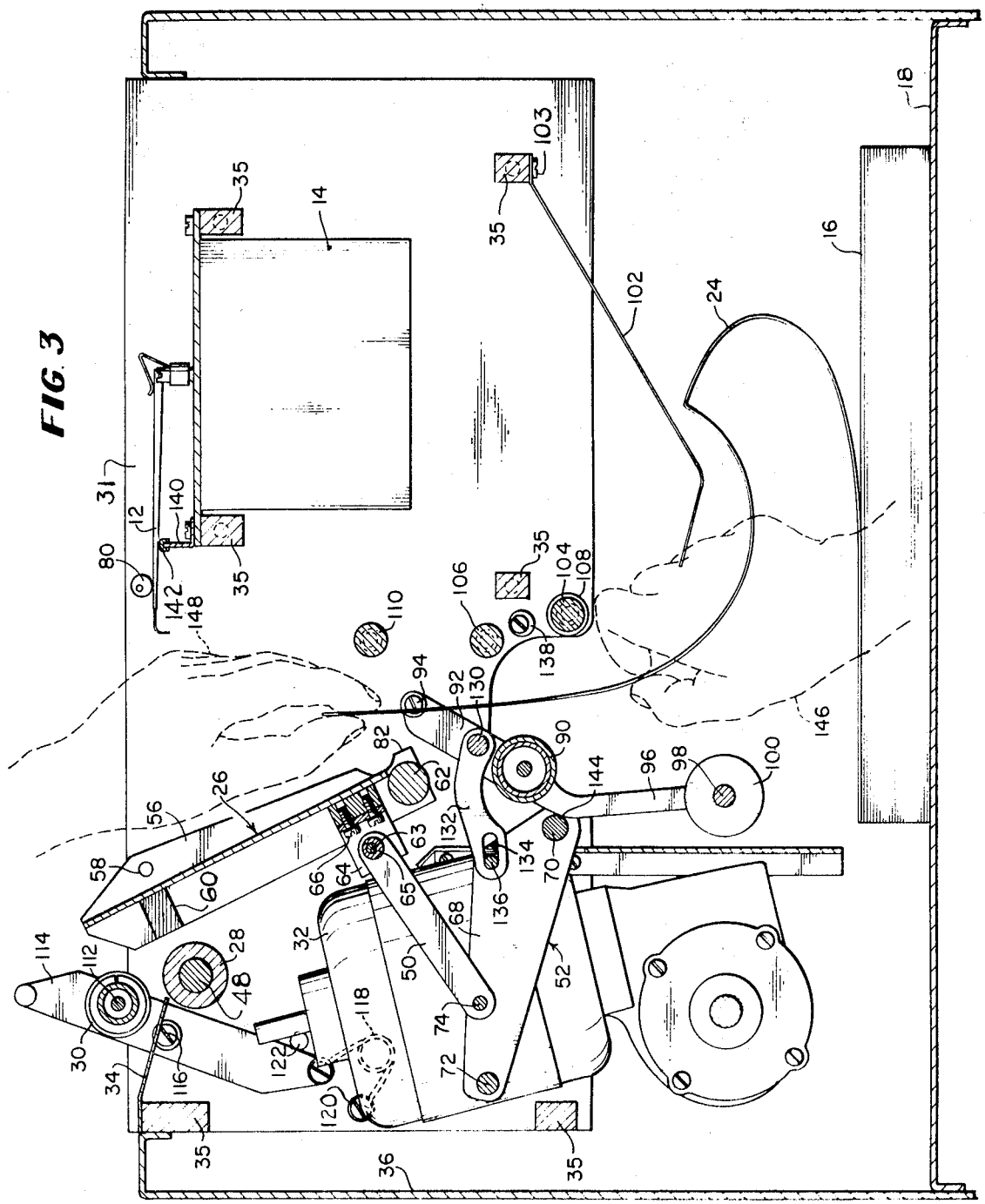
FIG. 3 is a sectional view similar to FIG. 2 but showing the writing table and back tension roller in released position during the initial threading of a Z-fold chart into the recorder.
Figure 4:
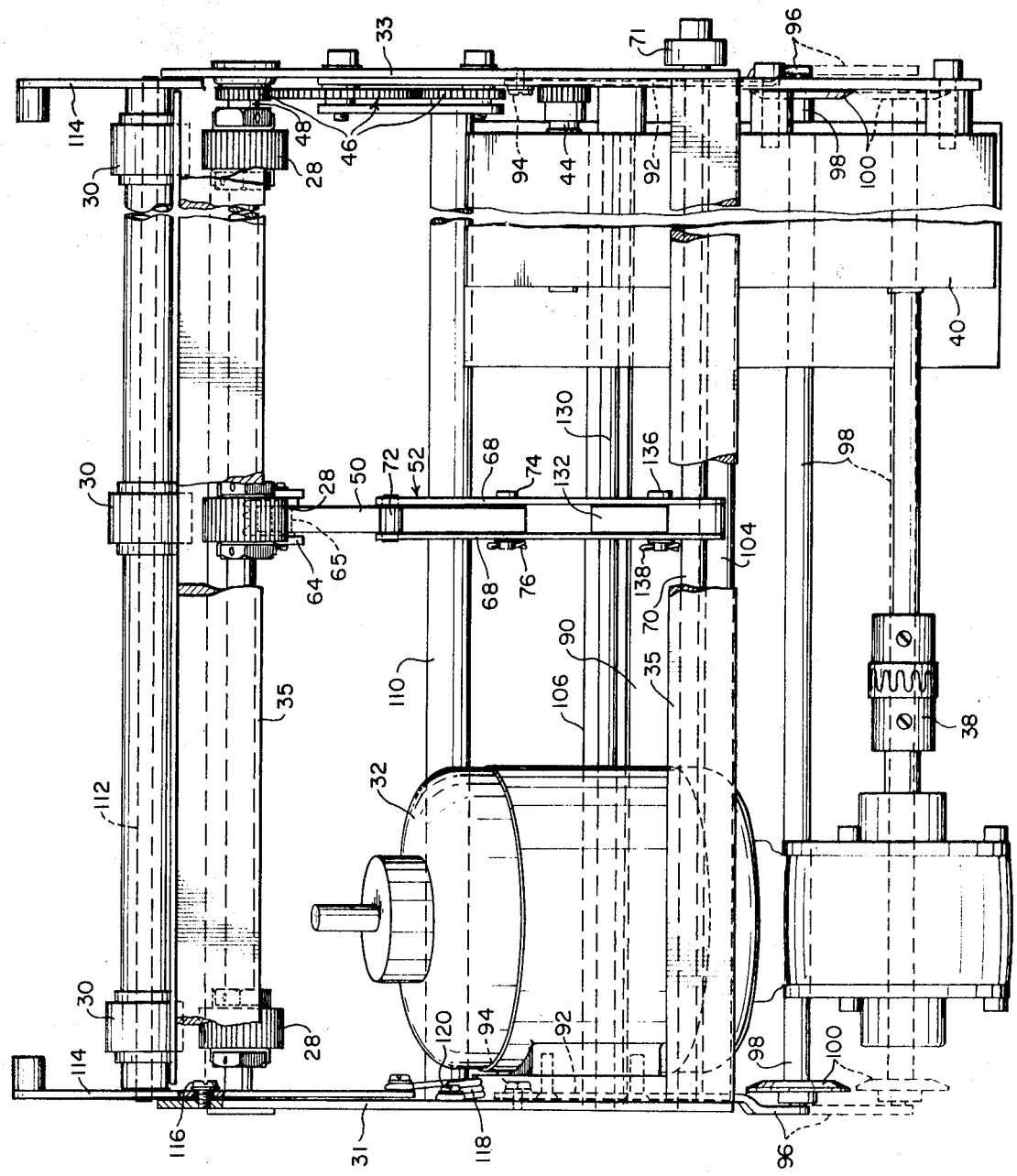
FIG. 4 is a sectional view taken along the lines 4—4 of FIG. 2.

Considering now the manner in which certain portions of the chart transport mechanism of the present invention are moved to an initial chart loading and threading position in which easy access is provided to the chart pack 16 positioned on the shelf 18, when the actuating crank 71 is moved to the position shown in dotted lines in FIG. 1, the shaft 70 is correspondingly rotated so that the chart transport mechanism is moved to the position shown in FIG. 3. Referring to this figure, the writing table 26 is tilted downwardly about the pivots 58. As this occurs, the recording pens 12 come to rest on a right angle bracket 140 provided with a cushion 142 on which the recording pens 12 are seated. As the shaft 70 is rotated and the drive link 52 is correspondingly moved counterclockwise about the shaft 70 as viewed in FIG. 3, the pin 136 is moved to the opposite end of the slot 134 and then pivots the roller support links 92 about the pivots 94 so that the back tension roller 90 and guide bar 98 are moved to the position shown in FIG. 3.

The writing table 26 and the back tension roller 90 and guide bar 98 come to rest in the position shown in FIG. 3, under the influence of gravity, by engagement of the edges of the roller support links 92 with the drive link shaft 70 at the point 144. Accordingly, when the above-described elements of the chart transport have been moved to the loading or threading position shown in FIG. 3, the central area of the transport is cleared so that a substantial space is provided between the writing table 26 and the recording pens 12 and the guide bar 110, while at the same time a substantial space is provided between the back tension roller 90 and the guide members 104 and 106. The guide bar 98 is also moved to provide substantial clearance between the rollers 104 and 106. Accordingly, the lead end of the chart web 24 may be easily fed up through the central space provided in the transport, as indicated in dotted lines in FIG. 3, by the hand 146, and may be grasped from above by the other hand of the operator, as indicated in dotted lines at 148 in FIG. 3. The chart web 24 is then pulled up in sufficient length to reach the drive rollers 28 and the free hand 146 of the operator can then operate the table-actuating crank 71 to return the displaced elements of the chart transport to the recording position shown in FIG. 2. As this occurs, the chart is automatically threaded in the correct relationship to all of the guide and control elements of the chart transport. The chart lead is then passed through the space between the pressure rollers 30 and the drive rollers 28, the pressure roller support arms 114 are lowered to place the pressure rollers 30 against the chart web and the unit is then ready for recording. It will be noted that as the writing table 26 is moved back to the horizontal position the recording pens are simply lifted off of the bracket 140 by engagement with the chart paper on the table 26, the chart paper having already been properly registered with respect to the recording pens by positioning between the sideplates 56. Accordingly, engagement of the recording pens with the chart paper is accomplished automatically as the table 26 is brought back to a horizontal position. Also, due to the flexure of the shaft 70 and bar 130 the over-center toggle mechanisms described heretofore are held locked in the normal recording position under spring loading so as to prevent shock or vibration from causing movement of the controlled elements to the loading position.

While the present invention has been illustrated in connection with a Z-fold chart pack, it will be understood that other forms of chart supply, such as a roll of chart paper, may equally well be employed insofar as the present invention is concerned.

While but a single embodiment of the present invention has been here specifically disclosed, it will be apparent that many variations may be made therein, all within the true spirit and scope of the invention.

What is claimed as new and desired to be secured by Letters Patent of the United States is:

1. In a chart recorder, the combination of, a back tension roller, a substantially horizontal writing table positioned above said back tension roller, a recording device adapted to engage a chart positioned on said writing table, a chart supply positioned beneath said back tension roller, and means pivotally mounting both said writing table and said back tension roller so that they may be moved to a position which provides access to said chart supply from a point above the operating position of said writing table, thereby to facilitate initial threading of a chart over said writing table without damaging said recording device.

2. The combination of claim 1, wherein said writing table is pivotally mounted for downwardly tilting movement from a horizontal position.

3. The combination of claim 1, wherein said back tension roller is pivotally mounted for movement away from a pair of spaced-apart guide rollers to provide access space between said back tension roller and said guide rollers for said initial threading operation.

4. The combination of claim 1, wherein both said writing table and said back tension roller may be moved to said access position by means of a common control lever.

5. The combination of claim 1, wherein a guide bar is provided between said back tension roller and said chart supply which is arranged to be moved with said back tension roller to said access position.

6. In a chart recorder of the type which includes a chart supply, a guide bar positioned above said chart supply, a back tension roller positioned above said chart supply, a pair of guide members positioned adjacent said back tension roller, a writing table positioned above said back tension roller, a recording device adapted to engage a chart positioned on said writing table, and a pressure roller positioned beyond said writing table, the chart extending from said supply over said guide bar, between said back tension roller and said pair of guide members and over said writing table to said pressure roller, the improvement which comprises means for pivotally mounting said writing table, said back tension roller and said guide bar so that they may be moved as a unit to provide access to said chart supply from a point above said writing table, thereby to facilitate initial threading of the chart around said guide bar between said back tension roller and said pair of guide members and over said writing table to said pressure roller.

7. In a chart recorder, the combination of, a writing table, a recording device adapted to engage a chart on said writing table near one end thereof, means pivotally mounting said table for movement from a horizontal position to a threading position in which said one end of said table is tilted downwardly and away from said recording device to provide a substantial opening between said one end of said table and said recording device, thereby to facilitate initial threading of a chart upwardly between said writing table and said recording device without damaging said recording device and wherein there is provided a drive link shaft extending transversely of said writing table, a drive link connected to said drive link shaft, a table-coupler link pivotally connected to said table and to said drive link, and stop means carried by said drive link and adapted to engage said table-coupler link so that said drive link and said table-coupler link act as an over-center toggle mechanism to hold said table in a horizontal position.

8. The combination of claim 7, wherein said drive link is positioned in the middle of said drive link shaft and said drive link shaft has sufficient flexure to permit said drive link and said table-coupler link to be moved to the over-center position.

9. The combination of claim 8, wherein means are provided for adjusting the effective length of said drive-coupler link, thereby to provide an adjustment of the flexure of said drive link shaft when said over-center toggle mechanism is in locked position.

10. In a chart recorder, the combination of, a chart supply, a back tension roller positioned above said chart supply, a pair of guide members positioned adjacent said back tension roller so that the chart is held in engagement with said back tension roller over a predetermined area, and means pivotally mounting said back tension roller for movement to a threading position on which said back tension roller is positioned a substantial distance away from said pair of guide members to facilitate threading of the chart therebetween and wherein there is provided a pair of side support members, said roller-mounting means includes a pair of links pivotally connected to said side support members and connected to the ends of said roller, a link shaft extending between said side members, a drive link connected to said shaft, and a roller-coupling link connected to said drive link and said pair of links, said drive link and said roller-coupling link acting as an over-center toggle mechanism for holding said back tension roller in locked position adjacent said pair of guide members.

11. The combination of claim 10, wherein said roller-coupling link is mounted on a separator bar connected between said pair of links, said separator bar having sufficient flexure to permit said drive link and said roller-coupling link to be moved to the over-center toggle position.

12. The combination of claim 11, wherein adjustable stop means are provided for said pair of links, thereby to permit adjustment of the locking force of said over-center toggle mechanism.